(12) United States Patent
Wang et al.

(10) Patent No.: US 10,219,248 B2
(45) Date of Patent: Feb. 26, 2019

(54) METHOD FOR COMMUNICATING TEST RESULTS FROM WIRELESS DEVICE UNDER TEST USING NON-LINK TESTING RESOURCES

(71) Applicant: LitePoint Corporation, Sunnyvale, CA (US)

(72) Inventors: Ruizu Wang, San Ramon, CA (US); Christian Volf Olgaard, Saratoga, CA (US); Qinghui Luo, Shanghai (CN)

(73) Assignee: LightPoint Corporation, Sunnyvale, CA (US)

( * ) Notice: Subject to any disclaimer, the term of this patent is extended or adjusted under 35 U.S.C. 154(b) by 191 days.

(21) Appl. No.: 15/357,013

(22) Filed: Nov. 21, 2016

(65) Prior Publication Data

US 2018/0146454 A1 May 24, 2018

(51) Int. Cl.
*H04W 72/02* (2009.01)
*H04W 4/80* (2018.01)
*H04W 24/10* (2009.01)
*H04L 29/12* (2006.01)

(52) U.S. Cl.
CPC ............ *H04W 72/02* (2013.01); *H04W 4/80* (2018.02); *H04W 24/10* (2013.01); *H04L 61/2038* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 7,826,381 | B1 | 11/2010 | Kastuar et al. |
| 2006/0012388 | A1 | 1/2006 | Lin et al. |
| 2011/0292809 | A1 | 12/2011 | Olgaard et al. |
| 2013/0291114 | A1 | 10/2013 | Nadgouda |
| 2015/0058691 | A1* | 2/2015 | Olgaard ............... H04W 24/06 714/734 |
| 2016/0261354 | A1 | 9/2016 | Hough |

OTHER PUBLICATIONS

International Searching Authority Search Report and Written Opinion dated Feb. 21, 2018 for International Application No. PCT/US2017/062738, Applicant, LitePoint Corporation, (10 pages).

* cited by examiner

*Primary Examiner* — Ayaz R Sheikh
*Assistant Examiner* — Sori A Aga
(74) *Attorney, Agent, or Firm* — Fountainhead Law Group P.C.

(57) ABSTRACT

A method for communicating test results from a wireless device under test (DUT) using non-link testing resources. Test data resulting from testing one or more operations of the DUT are combined with other data to form one or more data packets for transmission to a tester. The test data occupies, e.g., via encoding, a portion of the one or more data packets designated for data identifying the DUT or a tester.

8 Claims, 3 Drawing Sheets

METHOD FOR COMMUNICATING TEST RESULTS FROM WIRELESS DEVICE UNDER TEST USING NON-LINK TESTING RESOURCES

BACKGROUND

The present invention relates to testing of wireless devices, and in particular, to testing of wireless signal transceivers in non-link testing modes to reduce test times and communications required between the tester and device under test (DUT) during testing.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

Testing of such wireless devices typically involves testing of the receiving and transmitting subsystems of the device under test (DUT). The testing system will send a prescribed sequence of test data packet signals to a DUT, e.g., using different frequencies, power levels, and/or signal modulation techniques to determine if the DUT receiving subsystem is operating properly. Similarly, the DUT will send test data packet signals at a variety of frequencies, power levels, and/or modulation techniques for reception and processing by the testing system to determine if the DUT transmitting subsystem is operating properly.

For testing these devices following their manufacture and assembly, current wireless device test systems typically employ testing systems having various subsystems for providing test signals to each device under test (DUT) and analyzing signals received from each DUT. Some systems (often referred to as "testers") include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Ordinarily when testing a wireless device (e.g., a wireless fidelity (Wi-Fi), Bluetooth, Zigbee, Zwave or similar device) with a tester, once communications between tester and DUT have been established, the tester and DUT will execute a test flow during which the tester controls the behavior of the DUT by executing control commands via driver software associated with the DUT. Commands may include instructing the DUT to receive test packets from the tester, or to transmit packets to the tester. The characteristics of the packets may also be controlled, such as power level, frequency, data rate, modulation, etc.

Traditional methods of testing such devices is link-based, in which the tester interfaces the software stack of the DUT to establish a link as if the tester were a similar device. This approach can be advantageous inasmuch as it tests for software failures in addition to hardware failures and requires little if any code development for the tester to communicate with the DUT. In a production line, however, software tests are generally unnecessary, since target failures in such tests are due to manufacturing differences, which only affect the hardware. Hence, the time needed to setup and teardown a connection (link) is essentially a wasted and costly resource.

SUMMARY

A method for communicating test results from a wireless device under test (DUT) using non-link testing resources. Test data resulting from testing one or more operations of the DUT are combined with other data to form one or more data packets for transmission to a tester. The test data occupies, e.g., via encoding, a portion of the one or more data packets designated for data identifying the DUT or a tester.

A method for communicating test results from a wireless device under test (DUT), comprising:

combining, with the DUT, a plurality of test data to a plurality of other data to form one or more data packets, wherein the plurality of test data is related to at least one test of one or more operations of the DUT and occupies a portion of the one or more data packets designated for data identifying at least one of the DUT or a tester; and transmitting, with the DUT, the one or more data packets for reception by the tester.

A method for receiving test results from a wireless device under test (DUT), comprising:

receiving, with a tester from the DUT, one or more data packets containing a plurality of test data and a plurality of other data, wherein the plurality of test data is related to at least one test of one or more operations of the DUT and occupies a portion of the one or more data packets designated for data identifying at least one of the DUT or the tester; and processing, with the tester, the plurality of test data.

A method for communicating test results from a wireless device under test (DUT) to a tester, comprising:

combining, with the DUT, a plurality of test data to a plurality of other data to form one or more data packets, wherein the plurality of test data is related to at least one test of one or more operations of the DUT and occupies a portion of the one or more data packets designated for data identifying at least one of the DUT or the tester;

transmitting, with the DUT, the one or more data packets;

receiving, with the tester from the DUT, the transmitted one or more data packets; and processing, with the tester, the plurality of test data.

DETAILED DESCRIPTION

Figure 1:
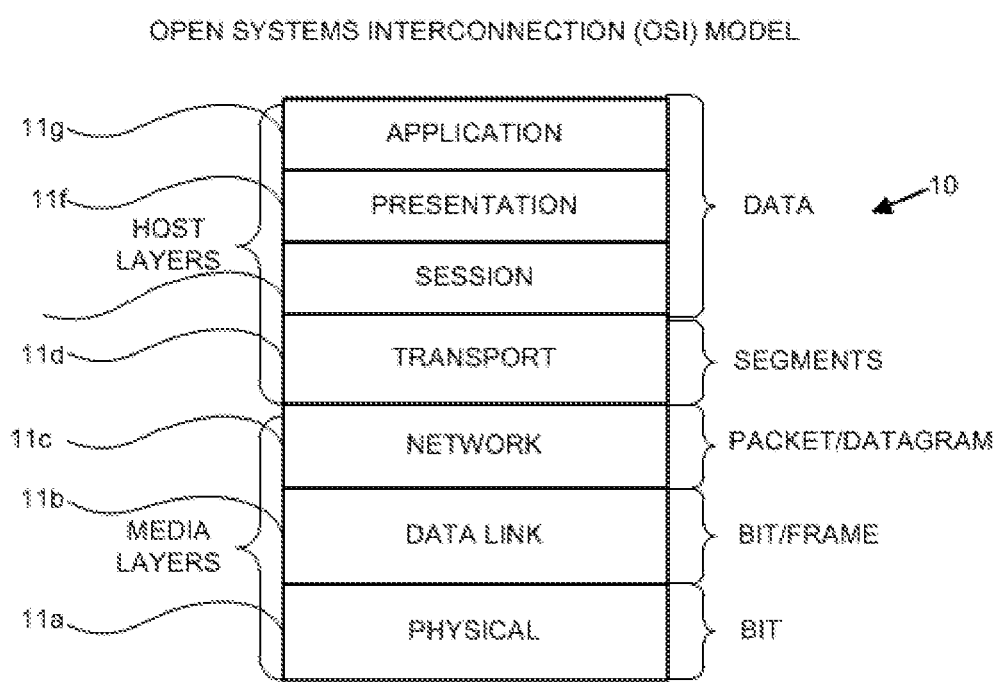
FIG. 1 depicts an exemplary representation of the Open Systems Interconnection (OSI) Reference Model stack.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies, such as IEEE 802.11a/b/g/n/ac ("Wi-Fi"), 3GPP LTE, Bluetooth, Zigbee, Zwave, etc. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

Testing of wireless devices, such as Wi-Fi, Bluetooth, Zigbee and Zwave devices, has progressed from frequent two-way messaging between a tester and device-under-test (DUT) to infrequent messaging between which major portions of test flows are executed within and coordinated between tester and DUT using non-link test solutions where only the unique device identifier and portions of the PHY are active. However, results of such tests would typically have been conveyed from DUT to tester via communications ports and pathways as the upper level of the protocol stack is not active, thereby preventing data from being easily conveyed in the transmitted packets. Therefore, where the only connection between a DUT and tester is either conducted or radiated signal paths and the data exchanged is via data packets, it may be difficult, if possible at all, for a DUT to convey test results to a tester using non-link test methods. As discussed in more detail below, in accordance with exemplary embodiments of the presently claimed invention, testing of a RF data packet transceiver can be performed, at least in part, by testing at lower layers of the network data packet signal communications protocol.

The following discussion is presented in a context of using Wi-Fi devices and their media access control (MAC) addresses as an example of the unique device identifier. However, it will be readily apparent to one of ordinary skill in the art of wireless data transceivers that such discussion is also applicable for Bluetooth devices for which a Bluetooth address or (BD_ADDR) is the unique device identifier, as well as Zigbee, Zwave and other similar devices.

Referring to FIG. 1, the Internet Protocol Suite has a networking model referred to as the Open Systems Interconnection (OSI) Model 10. This model 10 includes media layers and host layers, which, in turn, together include seven layers: physical 11a, data link 11b, network 11c, transport 11d, session 11e, presentation 11f, and application 11g.

The physical (PHY) layer 11a defines electrical and physical specifications of the data connection, and the protocol to establish and terminate a connection over the communications medium. It may also define a protocol for flow control, a protocol for providing connections between network nodes, and the modulation or conversion between the representation of digital data and corresponding signals transmitted over the physical communications channel.

The data link layer 11b provides reliable links between directly connected network nodes, e.g., by detecting and correcting errors that may occur in the physical layer 11a.

The network layer 11c provides functional and procedural means of transferring variable length data sequences (referred to as datagrams) between nodes within the same network (with the network being multiple connected nodes, each of which has an address and is permitted to transfer messages to other nodes by providing message content and the address of the designated node).

The transport layer 11d provides reliable conveyance of data packets between nodes with addresses located on a network, thereby providing reliable data transfer services to the upper layers. A common example of a transport layer protocol in the standard internet protocol stack is TCP (Transmission Control Protocol), which is usually on top of the Internet protocol.

The session layer 11e controls connections (dialogues) between computers, by establishing, managing and terminating connections between local and remote applications. It provides for simplex, half-duplex or full-duplex operation, and establishes checkpointing, adjournment, termination and restart procedures.

The presentation layer 11f provides context between application layer entities, which may use different syntax and semantics. This layer also provides independence from data representation (e.g., encryption) by translating between application and network formats, thereby transforming data into the form the application will accept. This layer also formats and encrypts data to be sent across a network.

The application layer 11g is closest to the end user. Accordingly this layer 11g and the user interact directly with the software application. For example, this layer 11g interacts with software applications that implement communication components.

Where a tester and DUT engage in testing with infrequent control exchanges and the DUT executing test flows between those infrequent exchanges, it is common for the DUT to send test results to the tester so that the tester can conditionally progress with further testing of the DUT. Where the DUT has an I/O connection to the tester or the control processing system of the tester, conveying test results in such a manner is routine. However, where the only connection between the tester and DUT is either a conductive or radiative data packet signal path (where measurements are carried out) via which data packets are exchanged, conventional techniques offer no methods for effectively conveying test results from DUT to tester when using limited capability non-link testing methods. Such methods have become increasingly desirable as fewer battery powered devices include external ports due to either esthetics or needs for sealing against contamination or moisture. Accordingly, in accordance with exemplary embodiments of the presently claimed invention, wireless testing methods advantageously use existing system features and protocols to communicate test results using conductive or radiative data packet signal paths via which the data packets are exchanged.

Figure 2:
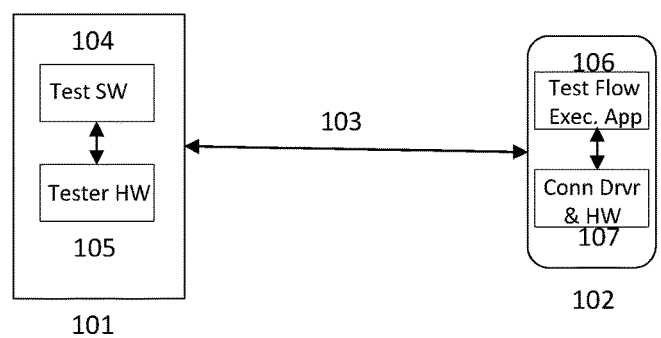
FIG. 2 depicts a testing environment in which the tester and DUT communicate via only a data packet signal path capable of conveying either conducted or radiated data packet signals.

Referring to FIG. 2, an exemplary testing environment is shown for testing using non-link test methodology via a single radio frequency (RF) signal connection 103 (conductive or radiative) between DUT 102 and tester 101. The tester 101 and DUT 102 follow respective predefined test flows. The tester 101 includes test hardware 105 (e.g., VSG and VSA) and test software 104 for execution by and/or for interaction with the test hardware 105. The DUT 102 includes a connectivity driver software (non-link mode) and hardware 107 and a test flow execution application 106 for controlling its testing by sending commands to the connectivity driver 107. For example, where the tester 101 is sending test data packets via the signal path 103 to the DUT 102, the DUT receiver (not shown) may be engaged in a bit-error rate (BER) test. At conclusion of the test, test results would ordinarily be sent by the DUT 102 to the tester 101 (a test specification for certification will often suggest this). In this testing environment, however, there is no separate I/O signal path for doing so. The only connection is via data packets sent or received via the data packet signal path 103.

Figure 3:
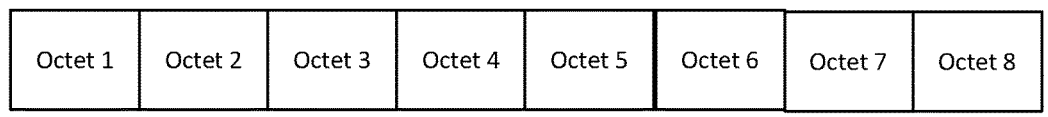
FIG. 3 depicts the eight octets of a data packet signal designated for data identifying a media access control (MAC) address.

Referring to FIG. 3, the series of data packets being communicated include a number of common and standard-specified features and/or characteristics, one of which is the MAC address that occupies eight octets (48 bytes) of the data packet signal. While MAC addresses are used in establishing and interacting in the link mode testing, they are also part of the PHY layer integrity during non-link mode testing, which requires, at a minimum, a destination MAC address (e.g., that of the tester during testing) and a source MAC address, which is the DUT MAC address. However, with a testing environment as depicted in FIG. 1, the DUT MAC address can be assigned by the user or device by being temporarily set to any desired value without affecting the PHY layer integrity. Accordingly, the MAC address can be used as a way to convey up to 48-bytes of test results data. Then, following conveyance of the test results, the MAC address can be reset so that the DUT MAC address matches the destination MAC address used in subsequently received data packets arriving from the tester to ensure reception by the DUT. Hence, a temporarily unique MAC address can be specified by the driver 107 for conveyance of test results data when operating the DUT 102 during testing in a non-link mode.

Figure 4:
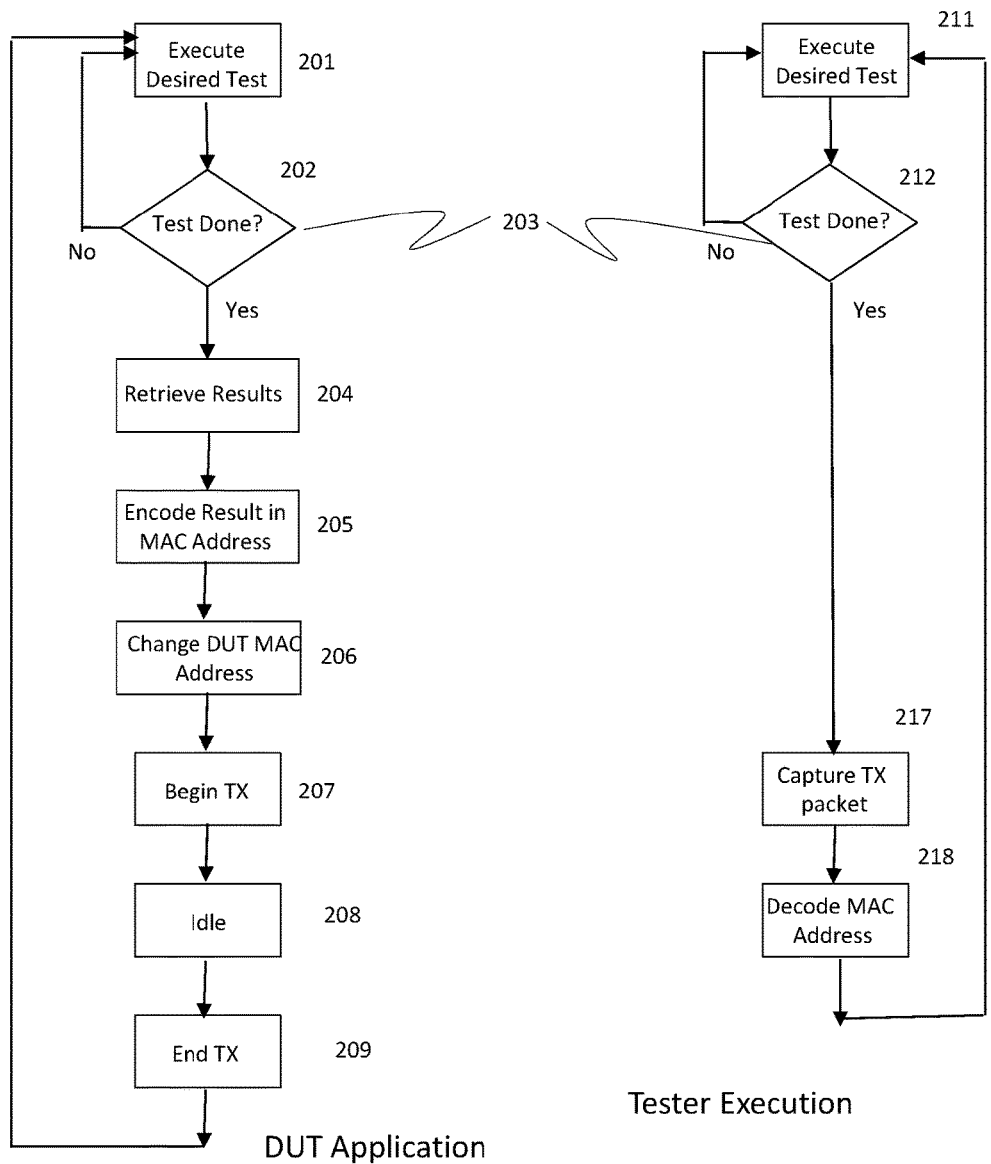
FIG. 4 depicts an exemplary test flow diagram for a manner in which a DUT and tester concurrently execute respective tests and test results from the DUT are provided to the tester in accordance with exemplary embodiments of the presently claimed invention.

Referring to FIG. 4, an exemplary test flow for such testing may proceed as shown. The tester and DUT each begin a test by executing a respective predefined test flow. The DUT executes its desired test 201 while the tester executes its desired test 211. The tests 201, 211 continue until it has been determined 202, 212 that such tests are 201, 211 completed 203. Following test completion, the DUT 102, via flow execution application 106 (FIG. 1), retrieves the test results 204 and adds the test results data to other data forming the outgoing data packet signal, e.g., by encoding the test results data within the MAC address octet 205. Such unique MAC address is then temporarily used as the DUT MAC address 206 in outgoing data packet signals.

Next, one or more data packets with the test-results-related MAC address is transmitted by the DUT 207 for reception and capture by the tester 217. The tester decodes that temporary MAC address 218 and processes it to retrieve the test results data for further processing as desired or needed. Meanwhile, the DUT remains in an idle state 208 and ends its signal transmission 209. With the test results data now captured, the tester can conditionally make a pass/fail decision and move on to the next portion of its predefined test flow.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for communicating test results from a wireless device under test (DUT), comprising:
    combining, with said DUT, a plurality of test data to a plurality of other data to form one or more data packets, wherein said plurality of test data is related to at least one test of one or more operations of said DUT and occupies a portion of said one or more data packets designated for data identifying at least one said DUT or a tester; and
    transmitting, with said DUT, said one or more data packets for reception by said tester,
    wherein said combining comprises encoding said portion of said one or more data packets designated for data identifying a wireless device address.

2. A method for communicating test results from a wireless device under test (DUT), comprising:

combining, with said DUT, a plurality of test data to a plurality of other data to form one or more data packets, wherein said plurality of test data is related to at least one test of one or more operations of said DUT and occupies a portion of said one or more data packets designated for data identifying at least one said DUT or a tester; and transmitting, with said DUT, said one or more data packets for reception by said tester;

wherein said wireless device address comprises one of a MAC address or Bluetooth address for said DUT.

3. A method for communicating test results from a wireless device under test (DUT), comprising:

combining, with said DUT, a plurality of test data to a plurality of other data to form one or more data packets, wherein said plurality of test data is related to at least one test of one or more operations of said DUT and occupies a portion of said one or more data packets designated for data identifying at least one said DUT or a tester; and transmitting, with said DUT, said one or more data packets for reception by said tester;

wherein said wireless device address comprises one of a MAC address or Bluetooth address for said tester.

4. A method for receiving test results from a wireless device under test (DUT), comprising:

receiving, with a tester from said DUT, one or more data packets containing a plurality of test data and a plurality of other data, wherein said plurality of test data is related to at least one test of one or more operations of said DUT and occupies a portion of said one or more data packets designated for data identifying at least one said DUT or said tester; and processing, with said tester, said plurality of test data;

wherein said wireless device address comprises one of a MAC address or Bluetooth address for said DUT.

5. A method for receiving test results from a wireless device under test (DUT), comprising:

receiving, with a tester from said DUT, one or more data packets containing a plurality of test data and a plurality of other data, wherein said plurality of test data is related to at least one test of one or more operations of said DUT and occupies a portion of said one or more data packets designated for data identifying at least one said DUT or said tester; and processing, with said tester, said plurality of test data;

wherein said wireless device address comprises one of a MAC address or Bluetooth address for said tester.

6. A method for communicating test results from a wireless device under test (DUT) to a tester, comprising:

combining, with said DUT, a plurality of test data to a plurality of other data to form one or more data packets, wherein said plurality of test data is related to at least one test of one or more operations of said DUT and occupies a portion of said one or more data packets designated for data identifying at least one said DUT or a tester;

transmitting, with said DUT, said one or more data packets;

receiving, with said tester from said DUT, said transmitted one or more data packets; and processing, with said tester, said plurality of test data;

wherein said combining comprises encoding said portion of said one or more data packets designated for data identifying a wireless device address.

7. A method for communicating test results from a wireless device under test (DUT) to a tester, comprising:

combining, with said DUT, a plurality of test data to a plurality of other data to form one or more data packets, wherein said plurality of test data is related to at least one test of one or more operations of said DUT and occupies a portion of said one or more data packets designated for data identifying at least one said DUT or a tester; and transmitting, with said DUT, said one or more data packets;

receiving, with said tester from said DUT, said transmitted one or more data packets; and processing, with said tester, said plurality of test data;

wherein said wireless device address comprises one of a MAC address or Bluetooth address for said DUT.

8. A method for communicating test results from a wireless device under test (DUT) to a tester, comprising:

combining, with said DUT, a plurality of test data to a plurality of other data to form one or more data packets, wherein said plurality of test data is related to at least one test of one or more operations of said DUT and occupies a portion of said one or more data packets designated for data identifying at least one said DUT or a tester; and transmitting, with said DUT, said one or more data packets;

receiving, with said tester from said DUT, said transmitted one or more data packets; and processing, with said tester, said plurality of test data;

wherein said wireless device address comprises one of a MAC address or Bluetooth address for said tester.

\* \* \* \* \*